Oct. 13, 1925. 1,556,939
J. B. LA PIERRE
STEERING WHEEL
Filed June 12, 1925
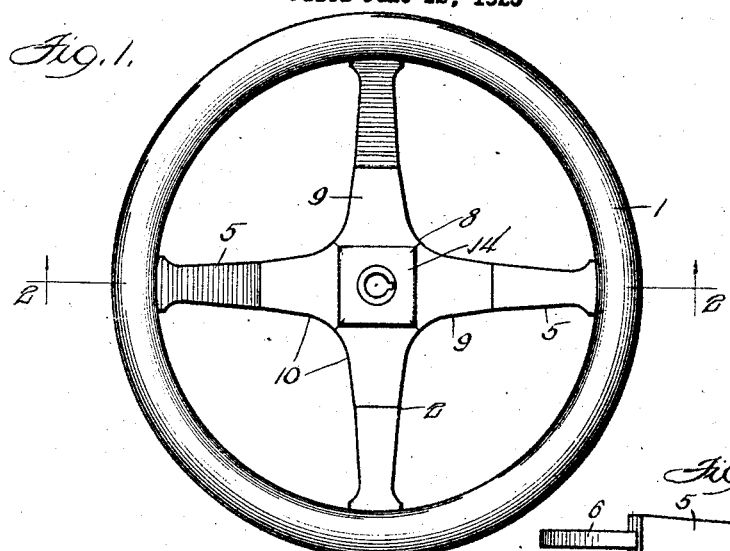
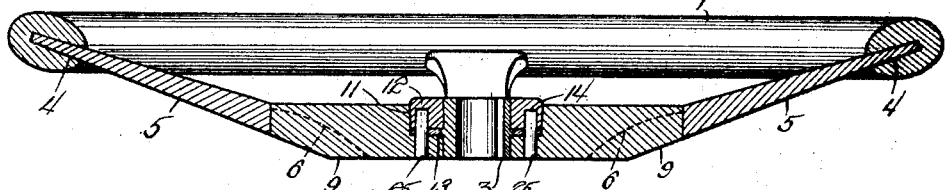
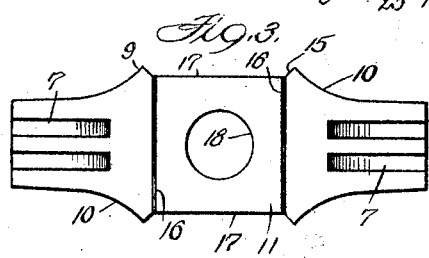
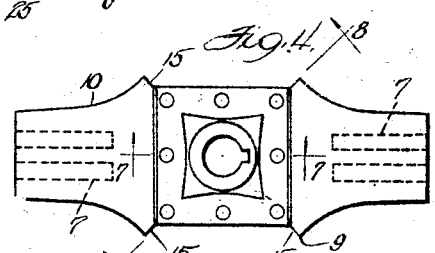
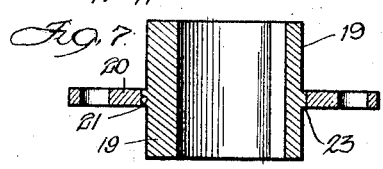
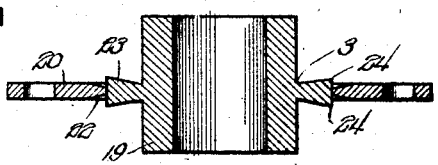
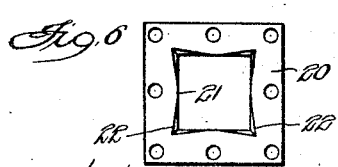
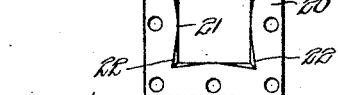

Patented Oct. 13, 1925.

UNITED STATES PATENT OFFICE.

JULIAN B. LA PIERRE, OF CHICAGO, ILLINOIS.

STEERING WHEEL.

Application filed June 12, 1925. Serial No. 36,657.

*To all whom it may concern:*

Be it known that I, JULIAN B. LA PIERRE, a citizen of the United States of America, and a resident of Chicago, county of Cook, and State of Illinois, have invented a new and useful Improvement in Steering Wheels, of which the following is a specification.

This invention relates to steering wheels and particularly to the types of steering wheels having wooden spiders.

Wooden steering wheels heretofore in use have included one type wherein the spider consisted of a rigid unitary structure, and another type wherein separate wooden spider arms were secured together at their inner ends by means of a metal hub. Both of such types are objectionable. In assembling the former type, it has been necessary to cut away a portion of the wheel rim at the points where the spider arms were attached and then, after the assembly of the rim and spider, to plug the grooves with filler blocks. The other type of wooden wheel employing a metal hub to bind the separate spider arms together has been objectionable as constructed heretofore, because the visible metal part detracted from the ornamental appearance of the wooden parts of the wheel.

A metal hub is required on all steering wheels employing a wooden spider in order to strengthen the wheel and to resist wear on the parts engaging the steering post.

The main objects of this invention are to provide a wooden spider having an improved form and arrangement of overlapping parts wherein a metal hub may be imbedded so as to be invisible, thereby giving the wheel the appearance of a solid wooden structure; to provide a wooden steering wheel wherein the rim and the spider may be readily assembled without cutting away any part of the rim, except the sockets for the spider arm ends, at the points where the spider arms are attached; to provide improved means for connecting together the separate parts of the spider so as to give it the strength of a unitary structure; and to provide a wooden steering wheel of this kind, which is inexpensive and durable and which may be quickly assembled, even by unskilled labor.

An illustrative embodiment of this invention is shown in the accompanying drawing, wherein Figure 1 is a top plan of a steering wheel to which this invention is applied.

Fig. 2 is a central transverse section, taken on the line 2—2 of Fig. 1.

Fig. 3 is a bottom plan of one of the overlapping parts of the spider.

Fig. 4 is a top plan of the other part, showing the metal hub seated therein.

Fig. 5 is a top plan of one of the spider arms.

Fig. 6 is a plan of the metal hub plate

Fig. 7 is a central vertical section of the metal hub, the view being taken on the line 7—7 of Fig. 4.

Fig. 8 is a vertical section of the metal hub, taken on the line 8—8 of Fig. 4, and showing the parts before the swedging operation.

In the specific construction herein shown, the steering wheel to which this invention is applied comprises an annular wooden rim 1, to which is attached an improved wooden spider 2, having embedded therein, a metal hub 3, which is adapted to be keyed to the vehicle steering post, not shown.

In the form shown, the rim 1 is oval in radial cross section, and, arranged at regular intervals in its inner periphery, are recesses 4 in which the outer ends of the spider arms are seated. The spider arms fit snugly in the recesses 4, and, if desired, they may be glued therein. With this improved form of connection between the rim and spider arms, the wheel rim is free from projections and patching, and presents no obstructions to the free sliding movement of the driver's hands around the wheel rim.

In the form shown, the improved spider 2 comprises a plurality of arms 5 having their outer ends seated in the recesses 4 of the rim 1 and having their inner ends formed to provide tenons 6 which engage mortises 7 formed in a wooden hub section 8, in which the metal hub 3 is embedded.

The spider arms 5 are inclined so as to locate the hub section 8 in a plane offset slightly from the plane of the rim 1. As shown in the drawing, the hub of the spider is located below the plane of the rim, but if desired, the arms 5 may be inclined in the opposite direction, so as to position the hub above the plane of the rim. The spider arms 5 are wedge-shaped increasing in thickness toward the inner ends thereof, so that their faces are flush with the adjacent faces of the section 8.

The spider section 8 comprises a pair of overlapping arms 9 which are mortised together by a half-lap joint. The arms 9 are substantially similar in construction and form continuations of the spider arms 5. The side faces 10 of the arms 9 are curved uniformly so as to present an ornamental appearance. The mortises 7 are formed in the lower faces of the arms 9, adjacent their outer ends, so that, after the spider arms 5 have been inserted into the rim, the wheel may be assembled quickly by inserting the hub section 8 in an axial direction between the arms 5 until the tenons 6 and mortises 7 interlock. The tenons 6 are cut below the upper faces of the arms 5 so that, from above the wheel, the arms 5 and 9 appear to be joined together by an abutting joint.

Formed in the central part of each of the arms 9, is a rectangular mortise 11 to receive the tenon 12 of the other part. The mortise 11 of each part 9 is of greater depth than the thickness of the corresponding tenon 12, so that, when the arms 9 are assembled in overlapping relation, the tenons 12 are spaced apart to provide a housing 13 between them, in which the metal hub 3 is embedded. When the arms 9 are interlocked, the lower faces thereof are flush with each other. For purposes of ornamentation, a rectangular boss 14 is formed on the upper arm 9 and projects above the flush upper faces of both arms 9. Formed on the arms 9 at each corner of the half-lap joint, are radially disposed abutting faces 15 which are arranged so that, when the spider is viewed edgewise, the arms 9 appear to be joined together by abutting joints rather than a half-lap.

The side faces 16 of the mortises 11 and the corresponding faces 17 of the tenons 12 are tapered inwardly so that the plate of the metal hub 3 may be wedged tightly between the walls of the housing 13. Extending axially through the tenons 12, is a cylindrical bore 18 in which the quill of the metal hub 3 is seated.

In the specific construction herein shown, the hub 3 comprises a quill 19 fitting closely in the bore 18 and a substantially flat plate or flange 20 which is embedded in the housing 13 between the tenons 12. The quill 19 and plate 20 may be cast as a unit or they may be two separate pieces joined together in the improved manner shown in the drawing. The plate 20 is preferably a stamping and the quill 19 a screw machine product.

In the form shown, the plate 20 is rectangular so as to fit closely within the mortises 11. Formed in the plate 20, is a centrally located rectangular opening 21, through which the quill 19 extends. The opposite faces of the plate 20 are beveled at the corners of the opening 21, as shown at 22. Integrally formed on the quill 19, is a centrally located rectangular flange 23 which fits closely within the rectangular opening 21 of the plate 20. The flange 23 is thicker at its corners than at its medial parts, so as to provide an excess of metal 24 which may be swedged over the beveled portions 22 on both sides of the plate 20 for rigidly securing the plate 20 and quill 19 together.

To assemble a steering wheel embodying this invention, glue is applied to the recesses 4 and the outer ends of the spider arms 5, and the arms are then individually inserted into the rim 1. Glue is applied to the inner side faces of the mortises 11 and tenons 12, and the metal hub 3 is then inserted into one of the arms 9. The two arms 9 are then clamped together in overlapping relation, and if desired, they may be additionally secured together by dowels 25 extending through one of the tenons 12 and the metal plate 20 of the hub 3 and into the other tenon 12 as shown in Figure 2. After the arms 9 of the hub section 8 have been assembled, glue is applied to the inner ends and tenons 6 of the arms 5 and to the outer ends and mortises 7 of the arms 9. The hub section 8 of the spider is then moved axially into interlocking engagement with the spider arms 5. After the glued joints have properly set, the wheel may be surfaced with suitable cutting and polishing tools.

Although but one specific embodiment of this invention has been herein shown and described, it will be understood that numerous details of the construction shown may be altered or omitted without departing from the spirit of this invention as defined by the following claims.

I claim:

1. In a steering wheel, a spider comprising a pair of intersecting arms mortised together and arranged to form a housing between them at the intersection, and a metal hub embedded in said housing.

2. In a steering wheel, a spider comprising a pair of overlapping arms mortised together, opposed faces of said arms being arranged to define a housing, and a metal hub embedded in said housing.

3. In a steering wheel, a spider comprising a pair of overlapping arms of substantially similar construction mortised together, the mortise of each arm being deeper than the thickness of the corresponding tenon so as to provide a space between the overlapping parts of said arms, and a metal hub enclosed in said space.

4. In a wheel, a spider comprising a pair of intersecting arms mortised together by a half lap joint and arranged to form a housing between the overlapping parts thereof, and a hub of different material than said spider embedded in said housing.

5. In a wheel, a spider comprising a pair of intersecting arms mortised together by a half lap joint and having radially disposed abutting faces at the corners of said joint, the overlapping parts of said arms being spaced apart to provide a housing between them, and a hub embedded in said housing.

6. In a wheel, a spider comprising a pair of overlapping arms mortised together and arranged to form a housing between the overlapping parts thereof, said overlapping parts having an opening extending axially therethrough, and a hub having a quill part seated in said opening and having a flange embedded in said housing.

7. In a steering wheel, a spider comprising a pair of overlapping wooden arms mortised together by a half lap joint and arranged to form a housing between the overlapping parts thereof, said overlapping parts having an axial bore, a metal hub having a quill seated in said bore for attachment to a steering post, and a flange on said quill embedded in said housing.

8. In a steering wheel, a spider comprising a pair of overlapping wooden arms mortised together by a half lap joint and arranged to form a housing between the overlapping parts thereof, said overlapping parts having an axial bore, a metal hub having a quill seated in said bore for attachment to a steering post, a flange on said quill embedded in said housing, and a plurality of dowels extending through one of said overlapping parts and into said flange.

9. In a wheel, the combination with a wooden spider, of a metal hub embedded in said spider and comprising a substantially flat plate having an opening therein, the opposite faces of said plate being bevelled adjacent to said opening, and a quill part extending through said opening and having portions thereof swedged over the bevelled edges of said plate.

10. In a steering wheel, the combination with a wooden spider, of a metal hub embedded in said spider and comprising a substantially flat plate having a polygonal opening therein, the edges of said plate adjacent said opening being bevelled on both sides of said plate, and a quill having a flange closely fitting said opening, said flange increasing in thickness toward its outer edges so as to provide portions adapted to be swedged over the bevelled edges of said plate.

Signed at Chicago this 10th day of June, 1925.

JULIAN B. LA PIERRE.